(12) United States Patent
Buelow et al.

(10) Patent No.: US 8,718,341 B2
(45) Date of Patent: May 6, 2014

(54) SYNOPSIS OF MULTIPLE SEGMENTATION RESULTS FOR BREAST LESION CHARACTERIZATION

(75) Inventors: Thomas Buelow, Grosshansdorf (DE); Rafael Wiemker, Kisdorf (DE); Martin Bergtholdt, Hamburg (DE); Lina Arbash Meinel, Homewood, IL (US)

(73) Assignee: Koninklijke Philips N.V., Eindhoven (NL)

( * ) Notice: Subject to any disclaimer, the term of this patent is extended or adjusted under 35 U.S.C. 154(b) by 244 days.

(21) Appl. No.: 13/131,140

(22) PCT Filed: Nov. 16, 2009

(86) PCT No.: PCT/IB2009/055105
§ 371 (c)(1),
(2), (4) Date: May 25, 2011

(87) PCT Pub. No.: WO2010/067219
PCT Pub. Date: Jun. 17, 2010

(65) Prior Publication Data
US 2011/0229004 A1 Sep. 22, 2011

Related U.S. Application Data

(60) Provisional application No. 61/120,979, filed on Dec. 9, 2008.

(51) Int. Cl.
*G06K 9/00* (2006.01)
(52) U.S. Cl.
USPC .......................................... 382/128; 128/922
(58) Field of Classification Search
USPC ......... 382/100, 128, 129, 130, 131, 132, 133, 382/171–173, 181, 190, 195, 203, 206, 382/254–259; 128/922; 378/4–27
See application file for complete search history.

(56) References Cited

U.S. PATENT DOCUMENTS 5,761,334 A * 6/1998 Nakajima et al. ............. 382/132
6,058,322 A * 5/2000 Nishikawa et al. ........... 600/408
(Continued)

FOREIGN PATENT DOCUMENTS

WO 2006069379 A2 6/2006
WO 2008050280 A1 5/2008

OTHER PUBLICATIONS

Lifeng Liu et al, "Multiple Sclerosis Medical Image Analysis and Information Management", XP008114225, The American Society of Neuroimaging, 2005, pp. 103S-117S.
Buelow, T., et al.; Segmentation of suspicious lesions in dynamic, contrast-enhanced breast MR images; 2007; Proc. of SPIE—Int'l. Soc. for Optical Engineering; vol. 6514; pp. 65140T.1-651401.12.

(Continued)

*Primary Examiner* — Anand Bhatnagar

(57) ABSTRACT

When characterizing a tumor or lesion as malignant or benign, a system (10) receives an image of the lesion volume (50), employs a processor (12) to perform a raw segmentation of the image, the results of which are stored to memory (14). Then processor then executes a hole-filling procedure to fill in dark areas in the image of the lesion representing necrotic tissue that absorbed little or no contrast agent, and optionally a leakage removal procedure to remove image voxels associated with non-lesion tissue, e.g., blood vessels, in which the contrast agent was present during imaging, to generate a complete lesion volume. A voxel analyzer (18) assesses a number of voxels included in the raw segmentation of the lesion image, and the final segmentation (e.g., after filling and optional leakage removal). A segmentation comparator (20) computes a ratio of dark area voxels related to necrotic tissue detected after the raw segmentation to total voxels detected in the final image segmentation. The ratio is then used to determine a likelihood of malignancy, with a higher ratio indicating a higher likelihood.

18 Claims, 5 Drawing Sheets

(56) References Cited

U.S. PATENT DOCUMENTS

| | | | |
|---|---|---|---|
| 6,112,112 A * | 8/2000 | Gilhuijs et al. | 600/425 |
| 6,754,374 B1 * | 6/2004 | Miller et al. | 382/128 |
| 6,898,303 B2 * | 5/2005 | Armato et al. | 382/131 |
| 7,251,374 B2 | 7/2007 | Niemeyer | |
| 2002/0006216 A1 * | 1/2002 | Armato et al. | 382/131 |
| 2004/0013292 A1 * | 1/2004 | Raunig | 382/128 |
| 2006/0245629 A1 | 11/2006 | Huo et al. | |
| 2007/0133852 A1 | 6/2007 | Collins et al. | |
| 2009/0312640 A1 * | 12/2009 | Wang et al. | 600/443 |

OTHER PUBLICATIONS

Chen, W., et al.; A Fuzzy C-Means (FCM)-based Approach for Computerized Segmentation of Breast Lesions in Dynamic Contrast-enhanced MR Images; 2006; Academic Radiology; 13(1)63-72.

Goto, M., et al.; Diagnosis of Breast Tumors by Contrast-Enhanced MR Imaging: Comparison Between the Diagnostic Performance of Dynamic Enhancement Patterns and Morphologic Features; J. Mag. Reson. Imaging; 25:104-112.

Jeong, K., et al.; Functional Imaging in photorefactive tissue speckle holography; 2008; Optics Communications; 281:1860-1869.

* cited by examiner

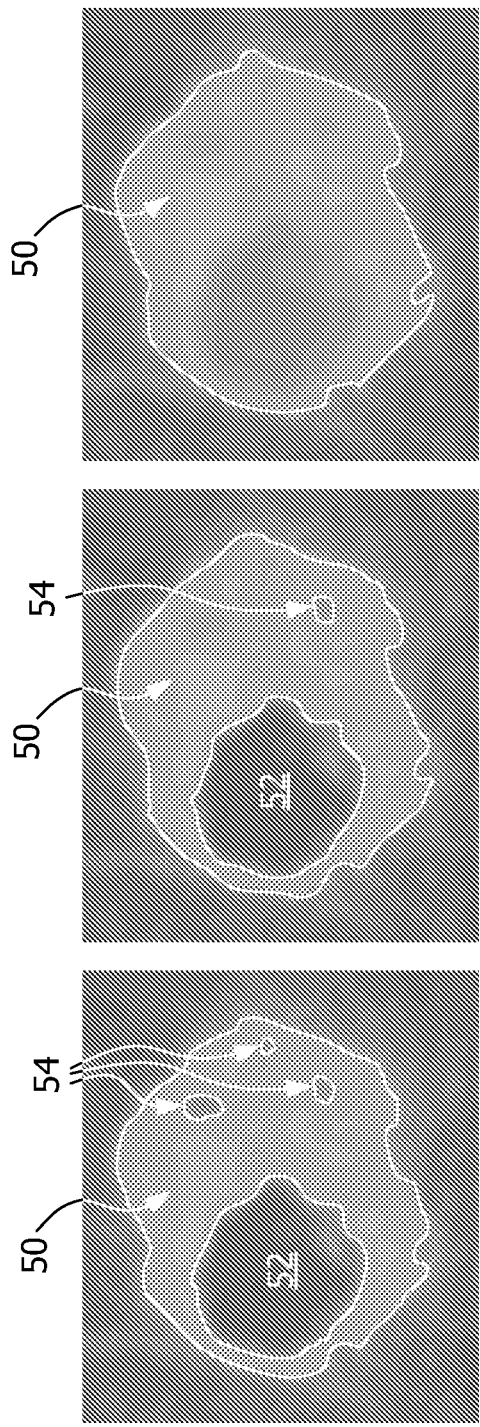

SYNOPSIS OF MULTIPLE SEGMENTATION RESULTS FOR BREAST LESION CHARACTERIZATION

The present application finds particular utility in characterizing tumors using anatomical images generated using magnetic resonance (MR) imaging techniques. However, it will be appreciated that the described technique(s) may also find application in other types of imaging systems, patient therapy systems, and/or anatomical structure characterization applications.

Methods for the segmentation of breast lesions, or tumors, from dynamic contrast enhanced MRI rely on intensity threshold comparisons due to the large morphologic variety of such lesions. In the case of inhomogeneous enhancement, interior portions of the lesion may be missed by these segmentation procedures. The missed interior parts of the lesions need to be filled in, in order to allow accurate volume assessment, morphologic assessment of the outer contour of the lesion, and for correct quantification of the heterogeneity of contrast uptake.

Breast MRI techniques clearly highlight most breast lesions. Not all of the detected lesions are cancerous, however. This introduces the task of distinguishing benign from malignant lesions, as well as classification into the existing varieties of sub-classes of benign and malignant tumors. Consequently, an important aspect of any computer-aided diagnosis system for breast MR data is the automatic characterization and classification of breast lesions. A host of features have been proposed, most of which make use of an automatically or manually pre-segmented region of interest. However, valuable information that is inherent in the intermediate results of the lesion segmentation remains unused.

For instance, segmentation, i.e., determining the outline of a tumor, lesion, or other structure, is typically performed iteratively in a number of steps. Initially, the tumor or other structure of interest appears as a normal part of the image. Because necrotic tissue does not absorb contrast agents, necrotic regions of the tumor appear as holes in the contrast enhanced tumor. Segmentation routines typically include a hole-filling subroutine that fills in holes or dark areas in a tumor image volume and defines the overall tumor, regardless of the regions that are necrotic. To many diagnosticians, the necrotic areas have diagnostic value. However, at the end of a conventional segmentation process, the tumor appears in the rest of the image as a lightened area, with dark necrotic regions filled in. Only the initial and final fully segmented images are retained under conventional techniques.

There is a need in the art for systems and methods that provide enhanced diagnostic information.

In accordance with one aspect, a lesion characterization system includes a processor that receives anatomical image data for an image of a lesion volume, executes a segmentation protocol on the image data, and identifies intermediate segmentation results for the image data after one or more actions in the segmentation protocol are executed. The system further includes a memory that stores at least the image data, and intermediate and final segmentation results, and a user interface on which at least the intermediate segmentation results and the final segmentation results are presented to a user for review.

In accordance with another aspect, a method of characterizing a lesion or tumor using intermediate image segmentation results includes segmenting an anatomical image of a lesion volume to generate an initial segmentation result, and performing a hole-filling procedure on the segmented anatomical image to fill in one or more volumes in the lesion, which are below a threshold intensity, to generate a hole-filled segmentation result. The method further includes subtracting a total number of voxels in the initial segmentation result for the lesion volume from a total number of voxels in the hole-filled segmentation result to determine a number of voxels associated with the one or more volumes that are below the threshold intensity. Additionally, the method includes dividing the number of voxels associated with the one or more volumes below the threshold intensity by the total number of voxels in the hole-filled segmentation result to determine a dark area rate that describes a ratio of voxels in the one or more volumes below the threshold intensity to total voxels in the lesion volume.

In accordance with another aspect, an apparatus for characterizing a lesion or tumor using intermediate image segmentation results includes means for segmenting a lesion volume from an anatomical image to generate an initial segmentation result, and for performing a hole-filling procedure on the segmented anatomical image to fill in one or more dark areas associated with necrotic tissue in the lesion, which dark areas exhibit limited or no uptake of contrast agent, to generate a hole-filled segmentation result. The apparatus further includes means for subtractively combining a total number of voxels in the initial segmentation result for the lesion volume and a total number of voxels in the hole-filled segmentation result to determine a number of voxels associated with the one or more dark areas, and for dividing the number of voxels associated with the one or more dark areas by the total number of voxels in the hole-filled segmentation result to determine a dark area rate that describes a ratio of dark area voxels to total voxels in the lesion volume. Additionally, the apparatus includes means for displaying initial and hole-filled segmentation results, and a representation of a ratio of the dark area voxels to the total voxels in the image of the lesion volume.

One advantage is that breast lesion assessment is improved.

Another advantage resides in the generation of additional diagnostic information.

Another advantage resides in visual display of intermediate segmentation results.

Another advantage resides in 3D computation of segmentation results, which yields more reproducible results than visual comparison on individually selected slices.

Still further advantages of the subject innovation will be appreciated by those of ordinary skill in the art upon reading and understand the following detailed description.

The innovation may take form in various components and arrangements of components, and in various steps and arrangements of steps. The drawings are only for purposes of illustrating various aspects and are not to be construed as limiting.

FIGS. 2-4 illustrate segmentation results for in image representation of a lesion after various stages of segmentation.

Figure 1:
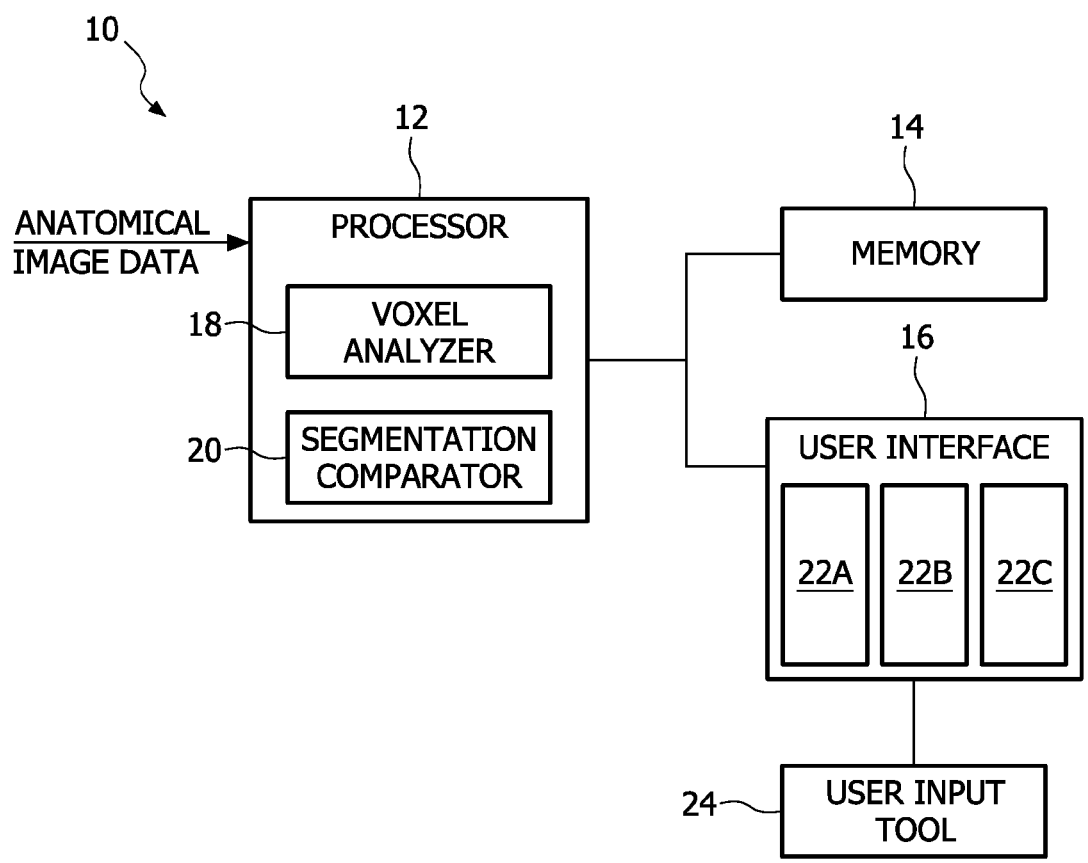
FIG. 1 illustrates a system that facilitates characterizing a lesion in a subject, such as a breast lesion, by analyzing intermediate segmentation results to determine a ratio, or rate of occurrence, of non-enhanced tumor voxels in the lesion volume.

FIG. 1 illustrates a system 10 that facilitates characterizing a lesion in a subject, such as a breast lesion, by analyzing intermediate segmentation results to determine a ratio, or rate of occurrence, of non-enhanced tumor voxels in the lesion volume. Non-enhanced tumor voxels are voxels of an anatomical image, such as an image of the tumor or lesion of interest, that do not absorb a contrast agent administered to the patient, thus resulting in a dark area in the image representing a necrotic region in the lesion volume. The system 10 provides a user (e.g., a physician, technician, or other clinician) with a synopsis of segmentation results, including the intermediate results showing necrotic regions, to permit the user to more easily assess potential malignancy in the imaged lesion.

The system 10 comprises a processor 12 that receives anatomical image data (generated using an MR device, a computed tomography (CT) scanner, or the like), and a memory 14 in which image data is stored (e.g., including segmented image data at various stages of segmentation). The processor and memory are coupled to each other and to a user interface 16 on which image(s) are displayed to the user. The processor includes a voxel analyzer 18 that analyzes voxels in the anatomical image data to evaluate intensity levels therefor, which are used in calculating an intensity threshold for the voxels. For instance, a mean (or other threshold) intensity for voxels in the image or the lesion of interest is calculated, and voxels having an intensity less than the threshold intensity are deemed non-enhanced voxels (e.g., voxels that have not absorbed a contrast agent used when generating the image). Non-enhanced voxels within the lesion are associated with dark image areas of necrotic lesion tissue. Non-enhanced areas outside of the tumor are associated with surrounding tissue.

Raw segmentation results showing the lesion image segmented into light and dark areas, are stored in memory 14. The processor 12 then executes a "hole-filling" algorithm that fills in the dark areas of the lesion image with interpolated voxel data consistent with non-necrotic lesion tissue voxels (e.g., voxels that absorbed the contrast agent prior to and/or during imaging), in order to permit volume calculations, contour detection, etc. Various hole filling techniques are contemplated. For example, voxels that are completely surrounded by contrast enhanced voxels can have their values replaced by that of adjacent surrounding tissue. As another example, values of voxels at the edge of a necrotic region can be replaced by the average or a weighted average value of nearest neighbor enhanced voxels. The process can be iteratively repeated until the hole is filled.

Once the lesion volume has been closed by filling in the dark areas, the "closed" segmentation results are stored in memory 14. The processor also addresses any "leakage" of contrast agent, e.g. contrast agent in blood vessels adjacent the tumor. The contrast agent is typically injected into the circulatory system and is carried by the blood to tissues which preferentially absorb it. Since a tumor encourages the growth of blood vessels to enhance its blood supply, there may be sufficient contrast agent in the blood feeding the tumor to highlight the feeding blood vessels with the contrast image, causing them to appear as extensions of the tumor volume. Although a segmentation routine can remove the blood vessels from the segmented region, e.g. by iteratively applying an edge or contour smoothing algorithm, knowledge of the existence and number of blood vessels is also of diagnostic value. For instance, such knowledge can be used in estimating treatment efficacy when compared to previous images. That is, an increase or decrease in the supply of blood vessels with treatment is indicative of the efficiency of the treatment. Thus, storing the closed segmentation results to memory permits valuable comparison observations to be made by the user or the system 10.

Leakage is removed to more accurately depict the lesion volume in some instances. The processor 12 optionally executes a post-processing leakage removal algorithm that is executed to remove or deemphasize voxels in the image that depict blood vessels or non-lesion volumes that have absorbed contrast agent. For example, thin, elongated regions which are typically indicative of a blood vessel can have their valves reduced to that of non-enhanced voxels and the edge or contour smoothing repeated. The cleaned final results (e.g., post-leakage removal) are then stored to memory 14.

A segmentation comparator 20 compares different (e.g., initial, intermediate and final) segmentation results (e.g., raw, closed or filled, and cleaned segmentation results) from the different stages of the iterative segmentation of the image volume, and presents the initial, one or more intermediate, and final results to the user via one or more display ports 22 on the user interface. For example, raw segmentation results are displayed on a first display port 22A, closed or filled segmentation results are displayed on a second display port 22B, and cleaned final segmentation results are displayed on a third display port 22C.

In another embodiment, raw (e.g., initial) segmentation results are displayed in the first display port 22A and refined intermediate segmentation results (e.g., closed or cleaned) are displayed in the third display port 22C, while the second display port 22B displays an overlay of the raw and closed or cleaned segmentation results. The user employs a user input tool (e.g., a keyboard, stylus, mouse, or the like) to manipulate the overlay images between purely raw segmentation results and the closed or cleaned segmentation results in order to perceive rim enhancement or other effects of the segmentation process, which facilitates assessing the malignancy of the lesion. Optionally, each intermediate image of the iterative segmentation process can be displayed in order in a cine mode.

The segmentation analyzer 20 is also optionally capable of calculating a ratio of unenhanced lesion voxels (e.g., necrotic lesion voxels indicative of lesion tissue that does not absorb contrast agent) to total lesion voxels. The resulting "dark area rate" describes the ratio of necrotic lesion tissue to total lesion tissue, which is employed in assessing malignancy of the lesion. For instance, higher ratios of necrotic tissue are associated with increased probability of malignancy. In this manner, the system 10 facilitates making use of the intermediate segmentation results and extracting relevant information for the characterization of the lesion from the synopsis of the intermediate and final segmentation results. The systems and methods described herein can furthermore be applied in other lesion segmentation applications, including but not limited to CT lung nodule segmentation. Although the filling and leakage correction processes are described as segmented, they can also be performed concurrently or in either order.

FIGS. 2-4 illustrate segmentation results for in image representation of a lesion volume 50 after various stages of segmentation. In FIG. 2, the lesion 50 is shown after contrast enhancement at an automatically determined threshold, such as is determined by the voxel analyzer 18 (FIG. 1). The necrotic kernel 52 and smaller tumor portions 54 are dark(er) because inhomogeneous contrast agent uptake is not included in the lesion volume.

In FIG. 3, intermediate segmentation results for the lesion 50 are shown after partial hole-filling, during which some of the portions 54 have been filled in or lightened using interpolated voxel data. At this stage, the volume of the necrotic kernel 52 can be compared to the volume of the lesion.

Figure 6:
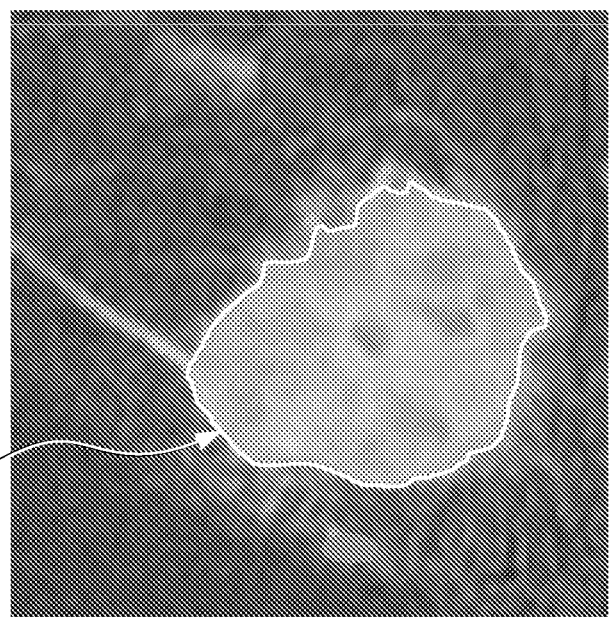
FIGS. 5 and 6 illustrate the lesion before and after execution of a leakage removal process.
Figure 5:
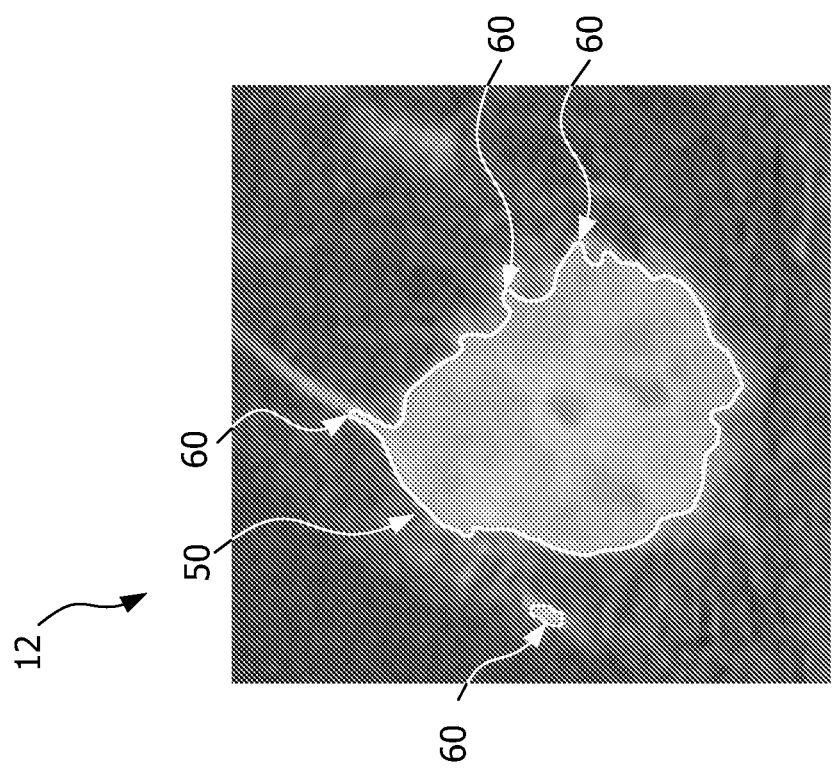

In FIG. 4, the filled segmentation for the lesion 50 is shown, wherein the hole-filling algorithm has been executed and the necrotic kernel 52 and other portions 54 have been filled in with interpolated voxel data to render a complete lesion volume. That is, the previously unenhanced interior portions of the lesion 50 have become incorporated into the segmented area. FIGS. 5 and 6 illustrate the lesion 50 before and after execution of a leakage removal process. In FIG. 5, the segmentation results lesion 50 are shown after a hole-filling procedure, with various detected leakage occurrences 60 where contrast agent leaked into peripheral blood vessels or other tissue around the lesion. In FIG. 6, the leakage occurrences 60 have been removed from the segmentation results using a leakage-removal procedure.

Joint visualization and use of intermediate and final segmentation results for the extraction of clinically relevant features thus facilitates the characterization of breast lesions. Rim enhancement of a lesion (e.g., enhancing rim intensity, relative to a darker lesion center) is an important feature for determining the malignancy of a given lesion. The difference in the volume of the lesion before and after leakage correction is indicative of the amount of blood supply to the lesion which can be used to assess tumor induced increases in blood supply vessels. Rim enhancement can be detected by comparing the raw initial segmentation of FIG. 5 with the final (closed) segmentation results of FIG. 6.

According to one embodiment for example, a subtraction image is computed such that a non-contrasted native scan is subtracted from a scan acquired after injection of a contrast agent. The lesion 50 is either automatically detected or interactively selected by the user (e.g., using the user input tool 24 of FIG. 1). An intensity threshold is computed for the initial raw segmentation and segmentation results at this level are presented to the user as shown in FIG. 2. Parts 52, 54 of the lesion 50 that were not included in the raw segmentation results due to limited contrast uptake are filled in using the previously described hole-filling algorithm, as shown in FIGS. 4 and 6. If there are vessels attached to the lesion, the raw segmentation may have leaked out into these vessels. In an additional post-processing step, such leakage is removed.

Figure 7:
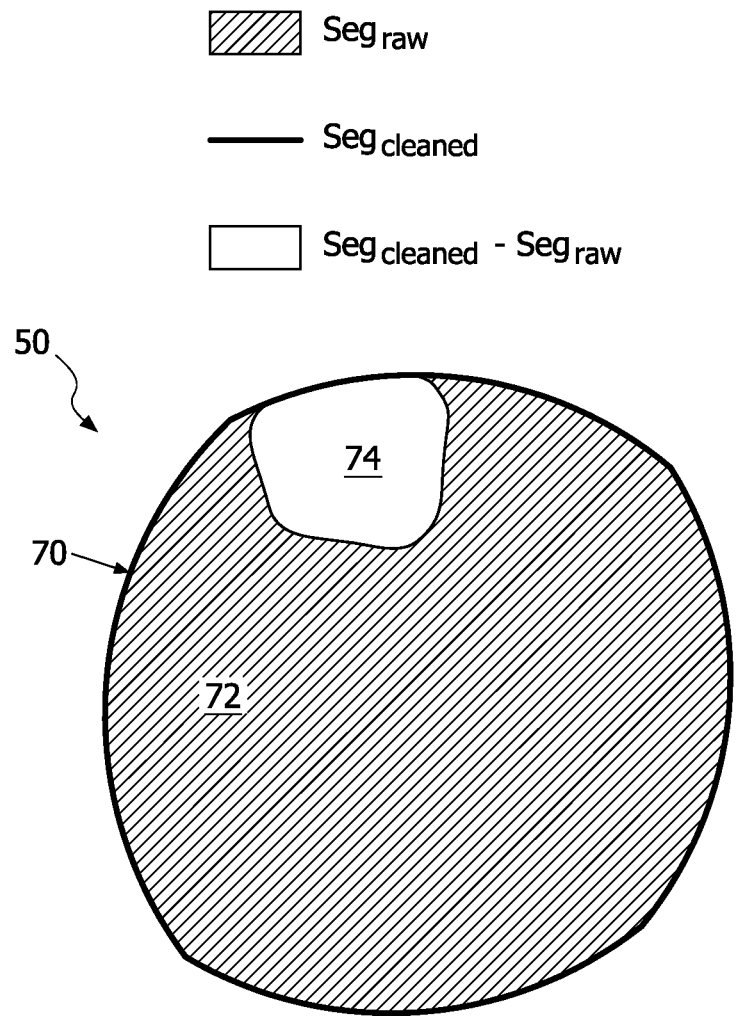
FIG. 7 illustrates a representation of segmentation result comparisons, where the lesion is illustrated as a total volume comprising a number cleaned final voxels, a total number of raw segmentation voxels, and a total number of dark area voxels (e.g., non-enhanced voxels indicative of necrotic tissue).

FIG. 7 illustrates a representation of segmentation result comparisons, where the lesion 50 is illustrated as a total volume 70 comprising a number cleaned final voxels that includes a total number of raw segmentation voxels 72 and a total number of dark area voxels 74 (e.g., non-enhanced voxels indicative of necrotic tissue). The dark area voxel count is determined by subtracting the raw segmentation voxel count from the cleaned final voxel count (e.g., after hole-filling and optionally leakage removal). In this manner, it is possible to determine a ratio of the number of voxels associated with necrotic tissue to the number of total voxels.

According to one embodiment, the existing intermediate and final results are designated as: "$Seg_{raw}$", which describes lesion image voxels in the connected component after raw segmentation at the calculated intensity threshold; "$Seg_{closed}$", which describes lesion image voxels after non-enhanced portions have been included using the hole-filling procedure; and "$Seg_{cleaned}$", which describes lesion image voxels after leakage has been removed. Given these results, the rate of non-enhanced, or "dark area" voxels that are part of the lesion are directly computed as:

Dark area rate=#($Seg_{cleaned}$-$Seg_{raw}$)/#($Seg_{cleaned}$).

Here, "#(Seg)" connotes the number of voxels in the segmented volume "Seg". The dark area rate is a number between 0 and 1, where 0 indicates that no voxels had to be included in the closing-step of the segmentation procedure. Higher values indicate larger percentage non-enhanced dark areas inside the lesion, which is correlated with a higher probability of lesion malignancy.

In FIG. 7, the non-enhanced dark voxel area 74 is along an edge of the segmented volume. When the dark voxel area 74 is along an edge of the volume, a closing process of segmentation routine closes the segmented volume, i.e. defines the surface of the segmented volume as encompassing the dark voxel area 74. For example, the necrotic tissue can be differentiated from the healthy non-enhanced tissue and included in the segmented volume.

Figure 8:
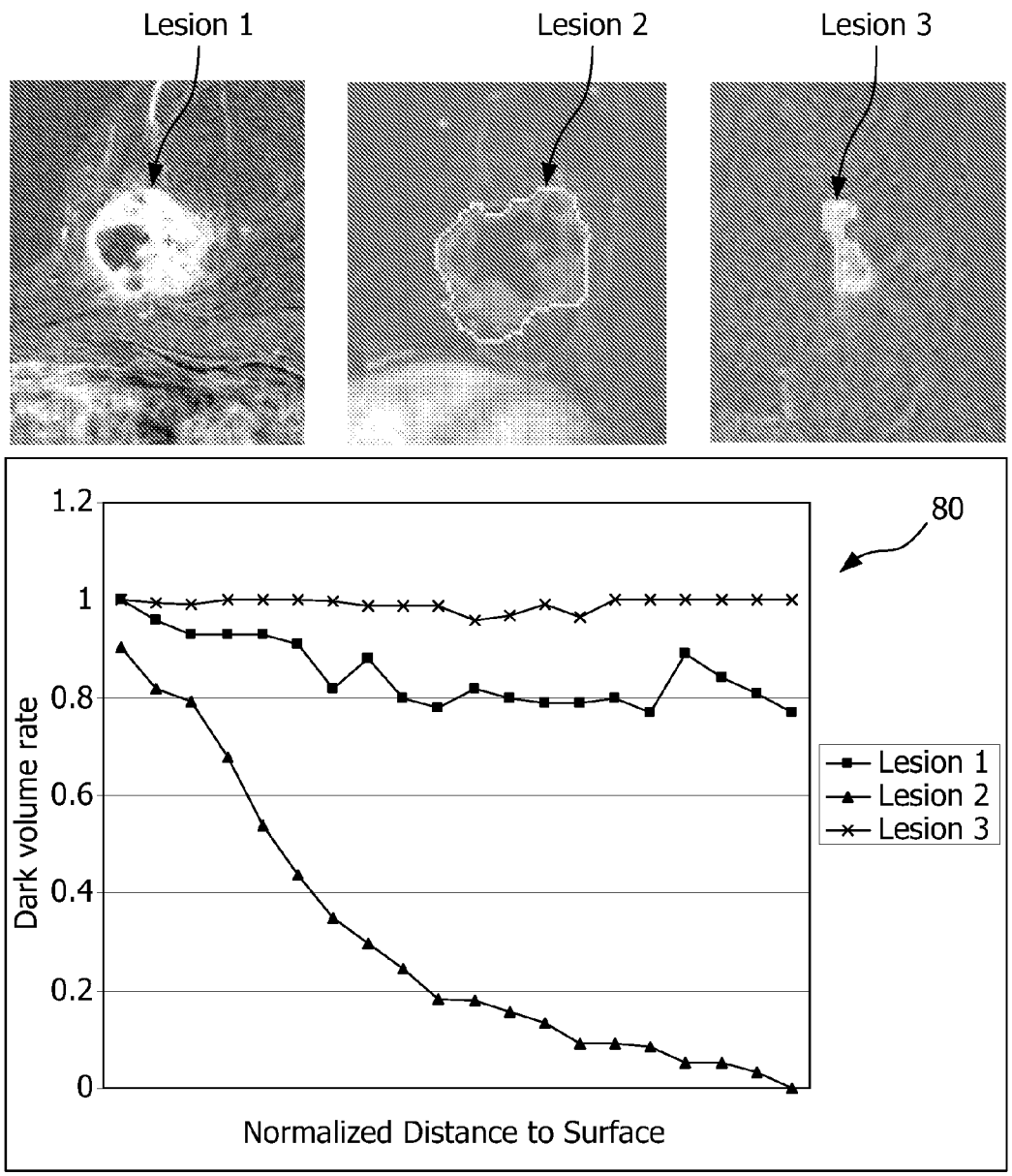
FIG. 8 illustrates a graphical representation of segmentation result comparison.

FIG. 8 illustrates a graphical representation of segmentation result comparison. In this embodiment, the dark area rate is presented to the user not as a number, but resolved by radius (e.g., distance from the lesion surface). In addition to the number of non-enhanced voxels (#$Seg_{closed}$), this embodiment visually presents the spatial distribution of non-enhanced portions of the lesion.

This figure shows 3 lesions, labeled Lesion 1, Lesion 2, and Lesion 3, respectively. Each lesion is represented by a corresponding line on a graph 80 that plots a correlation between the dark volume rate for each respective lesion and a normalized distance to the surface of the lesion. For instance, Lesion 1 shows a high dark area rate near the surface, which decreases to approximately 0.8 as distance from the surface is increased. Lesion 2 exhibits a dark area rate that decreases consistently as distance from the surface increases. Lesion 3 exhibits a relatively constant high dark area rate throughout, such that the dark area rate is uniform throughout the lesion and not reduced as distance to the surface increases.

An innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A lesion characterization system, including:
    a processor that receives anatomical image data for an image of a lesion volume, executes a segmentation protocol on the image data, and identifies intermediate segmentation results for the image data after one or more actions in the segmentation protocol are executed;
    a memory that stores at least the image data, and intermediate and final segmentation results; and
    a user interface on which at least the intermediate segmentation results and the final segmentation results are presented to a user for review;
    wherein the processor includes a segmentation comparator that calculates a rate of occurrence of non-enhanced voxels in the segmented image.

2. The system according to claim 1, wherein the intermediate segmentation results include raw segmentation results, closed segmentation results, and final segmentation results.

3. The system according to claim 1, wherein the processor calculates the rate of occurrence of non-enhanced voxels in a dark area as:

Dark area rate=($Seg_{cleaned}$-$Seg_{raw}$)/($Seg_{cleaned}$);

wherein $Seg_{raw}$ is the number of enhanced voxels in a connected component in a segmented volume before non-enhanced voxel removal, and $Seg_{cleaned}$ is the number of voxels in the final segmented volume after non-enhanced voxel removal.

4. The system according to claim 3, wherein the dark area rate is between 0 and 1, where a dark area rate of 0 indicates that no non-enhanced voxels are present in the segmented volume.

5. The system according to claim 3, wherein higher dark area rates are correlated to larger areas of necrotic tissue in the lesion volume, which are correlated with increased likelihood of malignancy of the lesion.

6. The system according to claim 1, wherein the processor executes machine-executable instructions stored in the memory for performing the segmentation protocol, including instructions for:
   generating a subtraction image by subtractively combining non-contrast agent enhanced native scan voxels and voxels acquired in a scan after injection of a contrast agent to generate raw segmentation results;
   detecting the lesion;
   computing an intensity threshold for the raw segmentation, the intensity threshold corresponding to limited contrast agent uptake;
   filling in areas of the lesion below the intensity threshold; and
   removing voxels above the intensity threshold that represent blood vessels feeding the lesion, if present.

7. The system according to claim 6, wherein the processor stores to the memory:
   the raw segmentation results;
   closed segmentation results obtained after filling in the areas of the lesion below the threshold; and
   cleaned final segmentation results obtained after removing the voxels representing blood vessels.

8. The system according to claim 1, wherein the anatomical image data is generated by an image scanner selected from the group consisting of a magnetic resonance (MR) imaging device and a computed tomography (CT) imaging device.

9. A lesion characterization system, including:
   a processor that receives anatomical image data for an image of a lesion volume, executes a segmentation protocol on the image data, and identifies intermediate segmentation results for the image data after one or more actions in the segmentation protocol are executed;
   a memory that stores at least the image data, and intermediate and final segmentation results; and
   a user interface on which at least the intermediate segmentation results and the final segmentation results are presented to a user for review;
   wherein the processor includes a segmentation comparator that calculates a rate of occurrence of non-enhanced voxels in the segmented image, which non-enhanced voxels are part of the lesion volume in the anatomical image, as a function of the intermediate and final segmentation results.

10. A method of characterizing a lesion using the system according to claim 1, including:
    segmenting an anatomical image including a lesion to generate an initial segmentation result;
    performing a hole-filling procedure on the segmented anatomical image to fill in one or more volumes in the lesion which are below a threshold intensity to generate a hole-filled segmentation result;
    subtracting a total number of voxels in the initial segmentation result for the lesion from a total number of voxels in the hole-filled segmentation result to determine a number of voxels associated with the one or more volumes that are below the threshold intensity; and
    dividing the number of voxels associated with the one or more volumes below the threshold intensity by the total number of voxels in the hole-filled segmentation result to determine a dark area rate that is a ratio of voxels in the one or more volumes below the threshold intensity to total voxels in the lesion.

11. A method of characterizing a lesion or tumor using intermediate image segmentation results, including:
    segmenting an anatomical image of a lesion to generate an initial segmentation result;
    performing a hole-filling procedure on the segmented anatomical image to fill in one or more volumes in the lesion, which are below a threshold intensity, to generate a hole-filled segmentation result;
    subtracting a total number of voxels in the initial segmentation result for the lesion from a total number of voxels in the hole-filled segmentation result to determine a number of voxels associated with the one or more volumes that are below the threshold intensity; and
    dividing the number of voxels associated with the one or more volumes below the threshold intensity by the total number of voxels in the hole-filled segmentation result to determine a dark area rate that is ratio of voxels in the one or more volumes below the threshold intensity to total voxels in the lesion.

12. The method according to claim 11, further including:
    detecting one or more contrast agent voxels in vascular structures adjacent the lesion and included in the segmented lesion volume; and
    performing a leakage removal procedure after the hole-filling procedure to remove the voxels associated with the vascular structures to generate an edge-corrected segmentation result.

13. The method according to claim 11, further including:
    displaying to a user a representation of the ratio of the voxels in the lesion that are below the threshold intensity to total voxels in the lesion.

14. The method according to claim 13, further including:
    graphically displaying the representation, showing dark area rate as a function of a distance to a surface of the lesion.

15. The method according to claim 11, further including:
    displaying to a user for comparison, at least the initial segmentation results and the hole-filled segmentation results.

16. The method according to claim 11, further including:
    reconstructing the anatomical image of the lesion from one of magnetic resonance (MR) data and computed tomography (CT) scanning device.

17. An apparatus for characterizing a lesion or tumor using intermediate image segmentation results, including:
    a processor configured to segment a lesion from an anatomical image to generate an initial segmentation result, and to perform a hole-filling procedure on the segmented anatomical image to fill in one or more dark areas associated with necrotic tissue in the lesion, which dark areas exhibit limited or no uptake of contrast agent, to generate a hole-filled segmentation result;
    a segmentation comparator configured to subtractively combining a total number of voxels in the initial segmentation result for the lesion and a total number of voxels in the hole-filled segmentation result to determine a number of voxels associated with the one or more dark areas, and for dividing the number of voxels associated with the one or more dark areas by the total number of voxels in the hole-filled segmentation result to determine a dark area rate that is ratio of dark area voxels to total voxels in the lesion; and a display for displaying initial and hole-filled segmentation results, and a representation of a ratio of the dark area voxels to the total voxels in the image of the lesion.

18. The apparatus according to claim 17, wherein the processor is further configured to perform a leakage removal procedure on the image of the lesion to remove portions of the segmented volume corresponding to the circulatory system.

* * * * *